United States Patent [19]

Danzik

[11] Patent Number: 5,000,262
[45] Date of Patent: Mar. 19, 1991

[54] VISCOSITY CONTROL ADDITIVES FOR FOAMING MIXTURES

[76] Inventor: Mitchell Danzik, 941 Barkley Ct., Pinole, Calif. 94567

[21] Appl. No.: 409,595

[22] Filed: Sep. 22, 1989

[51] Int. Cl.$^5$ .................. E21B 43/22; E21B 43/24
[52] U.S. Cl. .................... 166/272; 166/294; 166/303; 166/309; 252/8.554
[58] Field of Search ............... 166/272, 273, 274, 294, 166/303, 309; 252/8.554

[56] References Cited

U.S. PATENT DOCUMENTS

| | | | |
|---|---|---|---|
| 3,874,454 | 4/1975 | Clark et al. | 166/270 |
| 3,933,201 | 1/1976 | Kerfoot et al. | 166/275 |
| 4,393,937 | 7/1983 | Dilgren et al. | 166/272 |
| 4,556,107 | 12/1985 | Duerksen et al. | 166/272 |
| 4,607,700 | 8/1986 | Duerksen et al. | 166/303 |
| 4,643,256 | 2/1987 | Dilgren et al. | 166/272 X |
| 4,665,986 | 5/1987 | Sandiford | 166/272 X |
| 4,702,317 | 10/1987 | Shen | 166/272 |
| 4,703,797 | 11/1987 | Djabbarah | 166/272 X |
| 4,743,385 | 5/1988 | Angstadt et al. | 166/272 X |
| 4,820,429 | 4/1989 | Lim | 166/272 X |

FOREIGN PATENT DOCUMENTS 1248340 1/1989 Canada .

Primary Examiner—George A. Suchfield
Attorney, Agent, or Firm—Burns, Doane, Swecker & Mathis

[57] ABSTRACT

The method for the enhanced recovery of hydrocarbons from a hydrocarbon bearing reservoir during gas injunction into the reservoir comprises the at least periodic injection of steam and a foam-forming mixture into the reservoir from a known depth interval in a well source to provide a foam in the presence of residual oil and high gas permeable channels of the reservoir. The mixture comprises water, an effective foam forming amount of an alkyl aromatic sulfate component having an average molecular weight from about 400 to about 600 and at least one alkyl group comprising 18 to 24 carbon atoms and a viscosity control agent. The viscosity control agent comprises a surfactant which is present in an amount effective to prevent gelling of the mixture during storage. The reservoir fluids are contacted with the resulting foam so as to assist movement of the hydrocarbons toward a producing interval and the hydrocarbons are recovered from the producing interval.

57 Claims, 1 Drawing Sheet

VISCOSITY CONTROL ADDITIVES FOR FOAMING MIXTURES

BACKGROUND OF THE INVENTION

The present invention relates to the method for enhancing the recovery of petroleum from an oil bearing formation.

In the recovery of oil from reservoirs, the use of primary production techniques (i.e., the use of only the initial formation energy to recover the crude oil) followed by the secondary technique of water flooding, recovers only a portion of the original oil present in the formation.

Moreover, the use of certain enhanced oil recovery (EOR) techniques are also known in the art. These techniques can generally be classified as either a thermally based recovery technique i.e., utilizing steam, or a gas drive method that can be operated in a miscible or non-miscible manner.

Methods which employ steam are effective in the enhanced recovery of oil because the steam heats the formation, lowers the viscosity of the oil and thus, enhances the flow of the oil towards a production well. Moreover, these methods have become preferred methods for the enhanced recovery of low gravity, high viscosity oils and because steam can cost effectively provide heat to such oils.

However, in these steam based techniques, it is common that the steam will find short cut pathways from the injection well to some of the producing wells, thus bypassing, oil which is present in the zone between the injection well and the production well. Also, after the initial steam injection breakthrough at the production well, the steam injection preferentially follows the path of the breakthrough. These pathways can take the form of channels in the formation or of gravity override in the upper portion of the oil bearing stratum. Gravity override results from the lower density and viscosity of the steam vapor compared to liquid oil and water. Thus, the total amount of the formation that is swept by the steam injection is limited.

Various methods have been proposed to mitigate the loss of steam flow and heating value in the formation. For example, a number of commercial surfactants have been injected along with the steam to create a steam-foam flood. Surfactants form a foam that inhibits the flow of the steam into that portion of the formation containing only residual oil saturation and serves to physically block the volumes through which the steam is shortcutting. This forces the steam to move the recoverable hydrocarbons from the lesser portion of the reservoir towards the production well.

In addition, various inert and non-condensible gases have been added to the steam, both in the presence and absence of foaming surfactants in order to enhance and maintain the oil-driving force within the formation.

Examples of steam-foam processes can be found in U.S. Pat. Nos. 4,086,964; 4,445,573; 4,393,937; 4,161,217; and 4,085,800.

In particular, certain alkyl aromatic sulfonates have been employed as a surfactant within the steam-foam drive systems. See for example, Canadian Patent 1,247,850.

In general, these foaming agents are manufactured, transported, and stored, in a concentrated form prior to being employed within the field.

It has now been discovered that when higher average molecular weight alkyl aromatic sulfonates are subjected to extended storage (i.e., storage extending from days to several months, generally at temperatures about 70° F.) and/or exposure to cold temperatures (i.e., temperatures about 20° F.), they will increase in viscosity and become a gel-like mixture (i.e., a Brookfield viscosity greater than or equal to about 10,000-15,000 cp). This dramatic increase in viscosity makes field handling of the concentrate very difficult.

Thus, the need still exists for a composition which is effective in enhanced recovery procedures, particularly with steam, and which can be more easily handled within the field despite being subjected to storage for extended periods or exposure to low temperatures.

Accordingly, it is the object of the present invention to provide an effective method for enhancing the recovery of petroleum from oil-bearing formations.

It is a further object to provide a mixture which can be effectively employed with steam foam system and which is not subject to an undesirable increase in viscosity when stored, particularly for extended periods and/or after exposure to low temperatures.

These and further objects will become apparent from the specification and claims which follow.

SUMMARY OF THE INVENTION

In accordance with the foregoing objectives, the present invention relates to a method for enhancing the recovery of hydrocarbons from a hydrocarbon bearing reservoir. In particular, the present invention relates to a method for enhancing the recovery of hydrocarbons from a reservoir during gas injection into the reservoir which comprises periodically injecting gas comprising steam and a mixture including anionic surfactant into the reservoir at a known depth interval in a well to form a foam in the presence of residual oil and high gas permeable channels of the reservoir.

The reservoir fluids in the formation are contacted with the resulting foam and said gas away from the injection interval to assist movement of the reservoir fluids towards a producing interval in the reservoir and the subsequent recovery of the oil from the producing interval.

The mixture comprises water, an alkyl aromatic sulfonate component and a viscosity control agent. The alkyl aromatic sulfonate component which has an average molecular weight of about 400 to about 600, is present in an effective foam-forming amount and includes at least one alkyl group comprising 16–40 carbon atoms. The viscosity control agent is present in an amount effective to prevent gelling of the mixture.

In another aspect, the present invention relates to a process for recovering hydrocarbons from a subterranean hydrocarbon bearing formation which has been penetrated by at least one injection well and at least one production well where the foams assist movement of hydrocarbons toward the production well for recovery.

In another aspect, the present invention relates to a method for preventing the gelling of an aqueous mixture comprising water and an alkyl aromatic sulfonate during storage of the mixture comprising the addition of a viscosity control agent to the mixture. The viscosity control agent can either be added prior to storage and/or transporting the mixture or after the mixture has been stored for an extended period of time and/or after exposure to low temperatures.

In still another aspect, the present invention relates to a composition for use as a foaming agent in enhanced oil recovery operations.

DETAILED DESCRIPTION OF THE PREFERRED EMBODIMENTS

Figure 1:
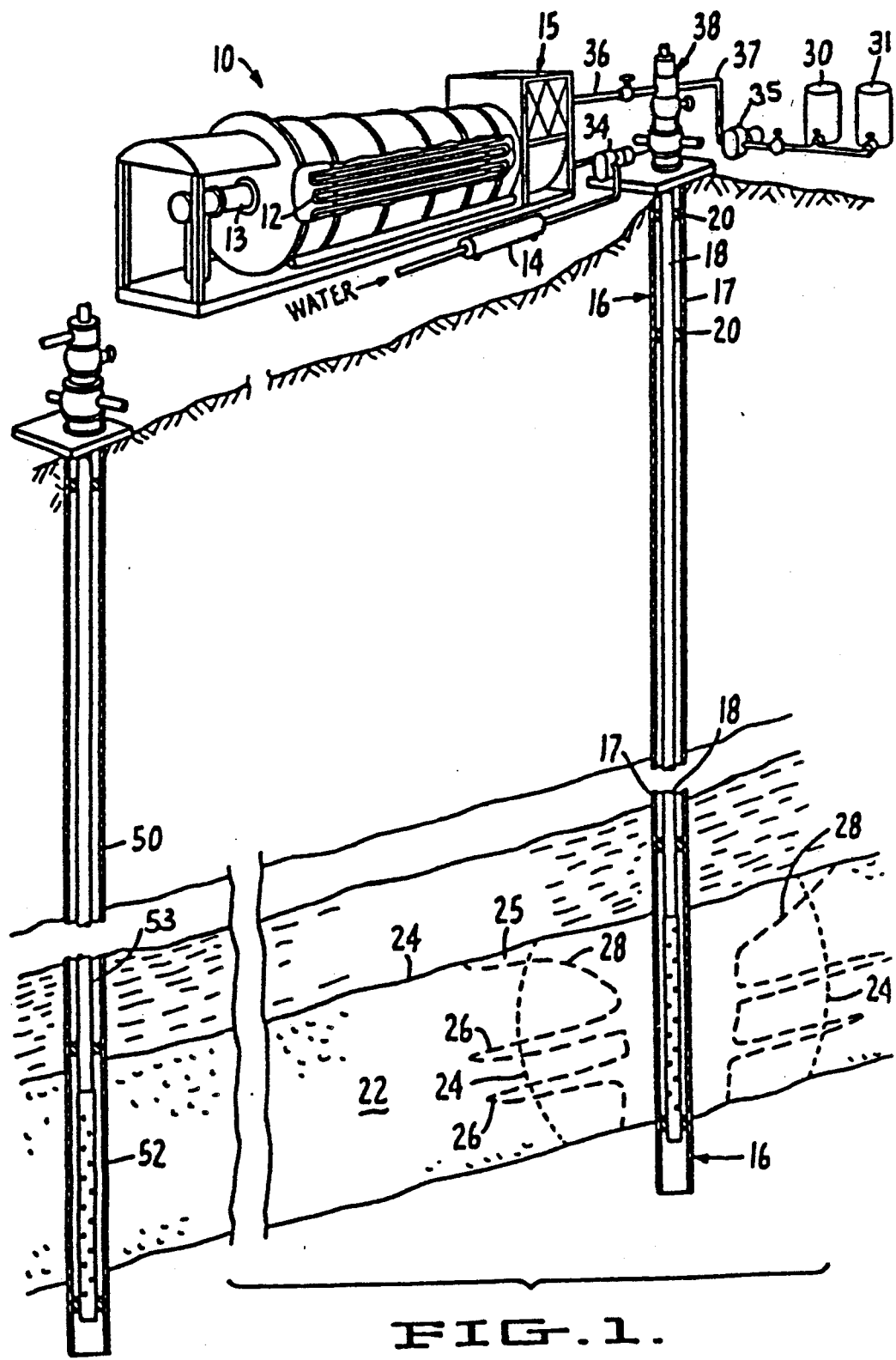
FIG. 1 illustrates a system which the process of the present invention can be employed.

The present invention relates to a method of enhancing recovery of petroleum from oil bearing formations. The method utilizes a foam forming mixture which can be effectively employed with steam. This mixture comprises water, an alkyl aromatic sulfonate, and a viscosity control agent.

The alkyl aromatic sulfonates useful in this invention have average molecular weights of from about 400 to about 600, more preferably about 450 to about 550 and most preferably about 475 to about 525. This number average molecular weight is calculated from the measured molecular weight of the precursor alkyl aromatic moiety. There are 102 mass units ($SO_3Na_{-1}$) added to the measured molecular weight determined by vapor pressure osmometry using toluene as the solvent (ASTM D-2503). Thus, the molecular weight of the alkyl aromatic sulfonates are based on sodium as the cation. Adjustments for other cations can readily be calculated by those skilled in the art.

The alkyl aromatic sulfonate employed within the present invention includes alkyl aromatic sulfonates where at least one of the alkyl groups which comprises 16–40 carbon atoms, preferably 20-30 carbon atoms and most preferably 20–24 carbon atoms.

The preferred alkyl group is a linear alkyl group which is derived from a linear alpha olefin such as those sold by Chevron Chemical Company, San Francisco, CA. Alkylation of the aromatic moiety with the alpha olefin results in the linear alkyl group. Preferred alkylation catalysts are acid catalysts.

By "linear alkyl group" is meant an alkyl group having mostly secondary carbon atoms ($—CH_2—$). The linear alkyl group can also have some additional branching. However, the degree of branching is such that the linear alkyl group is substantially straight chain, that is, greater than 80 number percent of the individual carbon atoms in the alkyl substituent are either primary ($CH_3—$) or secondary ($—CH_2—$) carbon atoms, preferably, greater than 85 percent.

Examples of linear alkyl groups useful in this invention include:
n-octadecyl
n-nonadecyl
n-eicosyl
n-heneicosyl
n-docosyl
n-tricosyl
n-tetracosyl The alkyl group employed can also be a branched alkyl group.

By "branched alkyl group" is preferably meant an alkyl group having at least one branch of 1 (methyl), 2 (ethyl) or more carbon atoms for every 3 carbon atoms along the longest chain of the alkyl group. Thus, in preferred branched alkyl groups, the number of carbon atoms in the longest chain is divided by 3 (rounded down to the whole number) and there will be at least this number of branches in the chain. Branched alkyl groups useful in this invention may be more or less branched than the preferred, provided that they are sufficiently branched to provide the desired foam forming characteristics. For example, the branching may average as much as every 2 or 2.5 backbone carbons or as little as one branch every 3.5 or 4 backbone carbons.

Examples of preferred branched alkyl groups useful in this invention include those derived from propylene and butylene polymerization such as tetramers, and higher molecular weight oligomers.

The alkyl aromatic sulfonates useful in this invention may be relatively pure compounds or mixtures of compounds. Mixtures of compounds are preferred. The composition of the alkyl aromatic sulfonates depends on the composition of the alkylating agent. Useful alkylating agents include alkyl halides and olefins; olefins are preferred.

The starting olefins used to alkylate the aromatic moiety may have a single carbon number or may be a mixture of carbon numbers.

Often, mixtures of olefin isomers are used to alkylate the aromatic moiety. Typically, commercially available alpha olefins are mixture of isomers which include alpha olefins, vinylidene olefins and internal olefins.

The aromatic component of the alkyl aromatic sulfonate preferably comprises benzene, ethyl benzene, toluene, xylene, cumene and naphthalene.

The sulfonate component can be present either in a water-soluble salt form comprising preferably sodium, potassium, ammonium or alkyl ammonium, or can be present in an acid form.

The water which can be effectively employed within the present invention can include water from any natural source.

Any known method for providing an admixture of water and alkylaromatic sulfonate can be employed. For example, the water can be mixed with 50% sodium hydroxide and a dispersant such as a nonionic alkyl phenol ethoxylate. This mixture is mixed and heated to a temperature, for example, of about 70° C. while an alkylaromatic sulfonic acid is added to the mixture by any known means, for example, by being pumped into the mixture over a controlled period of time.

In the mixture the alkyl aromatic sulfonate is present in an amount of about 5 to about 20% by weight, preferably about 8 to about 12% by weight with 9 to about 11% by weight being most preferred.

In the present invention, a "viscosity control agent" is added to the mixture. These agents include those surfactants which are effective preventing the gelling of the concentrate during storage, particularly storage over long periods of time and/or after exposure to low temperatures.

With regard to the use of the term "gelling", Applicants are referring to a Brookfield viscosity greater than about 10,000 to about 15,000 cp when the mixture has a concentration of alkyl aromatic sulfonates of about 10%.

The viscosity control agent can be added either prior to storage of the mixture or it can be added after the mixture has "gelled." If, for example, the mixture has already gelled, the addition of the viscosity control agent will be effective in both decreasing the viscosity of the gelled mixture while preventing subsequent "regelling" of the mixture. Thus, in either case, when the viscosity control agent is sufficiently mixed into the mixture, it is effective in providing a mixture having a desired viscosity which will not gel during subsequent storage and/or transporting.

For example, in the method for making the sulfonate where the alkyl aromatic sulfonic acid is added to the mixture of water, sodium hydroxide and the nonionic ethoxylate, the viscosity control agent can either be added prior to the addition of the alkyl aromatic sulfonic acid or after neutralization.

Moreover, the method for adding the viscosity control agent to the admixture of water and sulfonate is not critical. For example, an aqueous solution of the agent and sodium bicarbonate can be stirred into the above described admixture of the alkyl aromatic sulfonate and water.

Examples of viscosity control agents which can be employed within the present invention include alpha olefin sulfonates, alpha olefin sulfonate dimers, alkylphenolethoxylates, alkyldiphenylether disulfonates, dialkyl diphenylether disulfonates, alcohol ethoxysulfates, alcohol ethyoxysulfonates, lower molecular weight alkyl aromatic sulfonates, or mixtures thereof.

In particular, the lower molecular weight alkyl aromatic sulfonates which are employed have a molecular weight of about 300 to less than 400 with an alkyl group comprising 9 to 15 carbon atoms. Most preferably, these lower molecular weight alkyl aromatic sulfonates include C12 alkyl benzene sulfonates, which are either linear or branched as well as alkyl toluenes, xylenes, cumenes, naphthalenes.

The viscosity control agents which are preferably employed in the present invention include alpha olefin sulfonates, such as $C_{10}$ to $C_{24}$ AOS, preferably $C_{12}$ to $C_{16}$ AOS, and most preferably $C_{12}$-$C_{14}$ and alpha olefin sulfonate dimers such as those exemplified in U.S. Pat. No. 4,556,107.

The viscosity control agent is present in the mixture in an amount which is effective in preventing the gelling of the concentrate. Preferably, the additive is present in the mixture in an amount of about 0.2 to about 5% by weight with about 0.4 to about 2% being more preferred and about 0.8 to about 1.6% being most preferred.

In addition, the weight ratio of active components (i.e., the weight ratio of the alkyl aromatic sulfonate to the viscosity control agent), is from about 50:50 to about 99:1, with about 80:20 to about 97:3 being more preferred and about 92:7.5 to 97:3 being most preferred.

This steam that can be employed within the process of the present invention is that which is well known to be employed in the enhanced oil recovery art.

For example, in a steam drive oil recovery process, the liquid volume fraction or LVF is defined as the ratio of the volume occupied by the steam in the liquid phase to the total volume occupied by the liquid and vapor phases of the injected steam at down hole conditions.

By comparison, steam quality is defined as the weight percent of steam present in the vapor phase in the two phase (liquid+vapor) steam that is injected.

In steam based EOR processes, the quality of injected steam will generally vary from about 50 to about 80% with the typical range being about 60 to about 65%. Since the vapor phase occupies so much volume relative to the liquid phase, steam of 50 to 80% quality will result in a liquid volume fraction in the range of about 0.001 to about 0.005 or 0.1 to 0.5% by volume of a liquid of the injected steam. As the steam quality measures the weight quantity of the steam in the vapor phase, higher steam quality correspond to lower liquid volume fractions.

The steam employed within the present invention preferably includes a non-condensible gas such as nitrogen, methane, flue gas, carbon dioxide, carbon monoxide, air, or mixtures thereof, in an amount of 0 to about 50% by volume.

Moreover, the water phase of the steam can include electrolytes such as silicates and sodium chloride in an amount of about 0.1 to about 5% by weight.

In using the mixture of the present invention for the enhanced recovery of petroleum products, the foam may either be preformed outside of the well or "in situ" (i.e., in the formation). In either method, any method which is well known in the art for injecting a foam into the formation may be employed.

The present invention can be effectively employed in all oil bearing formations. However, the steam based techniques are particularly preferred in the enhanced recovery of low gravity, high viscosity oil from sedementary rock formations.

In particular, the steam-based recovery techniques which are preferably used in the present invention include both the cyclic and the steam drive methods. Each of these methods are well known in the art.

For example, in the cyclic method, the producing well may be the same well through which steam is periodically injected to stimulate petroleum flow from the reservoir (popularly called "huff and puff"). Alternatively, in the steam drive method, one or more producing wells may be spaced from the injection well so that the injected steam drives petroleum through the reservoir to at least one such producing well.

As an example of the present invention, a preformed foam is at least periodically injected into the formation. This periodic injection preferably involves the repeated injection of a slug of the foam into the well for a desired interval of time.

Desirably, the foam is preformed in the well tubing or formed on the surface, before the mix reaches the well. Most preferably, such foam is preformed by introducing the foamforming mixture and water into a stream of the gas flowing into the reservoir through the gas injection well tubing. This assures the foam production before injection into the producing formation.

A source of gas is supplied at a relatively high pressure (which is below the fracturing pressure of the reservoir formation) to an injection well. In practice, this may be a central well flowing radially outward to a group of producing wells surrounding the injection well. Alternatively, the injection well may be one of the several in a line capable of creating a front for a line-drive of oil through the formation from one or a line of producing wells.

FIG. 1 illustrates schematically a steam drive arrangement for injecting the foam-forming surfactant composition of the present invention into an at least partially depleted oil reservoir where it is desirable to reduce the steam or gas permeability. As indicated, the invention is particularly directed to the problem of controlling steam injection into a producing formation to heat the petroleum and thereby reduce its viscosity. The steam may also increase pressure in the formation to enhance the natural gas or stratigraphic pressures to increase petroleum flow into the same well, or an adjacent well, penetrating the formation. For this purpose a steam generator 10 typically generates steam from water in a single-pass through a continuous boiler tube 12 heated by a gas or oil-fired burner 13. Water for steam generating is supplied by pump 34 and typically it will include minerals and salts which replicate or, are compatible with, connate water in the formation. Desirably, water may pass through a "water-softener", or ion exchange medium 14, and is heated in boiler tubes 12 sufficiently to form a low quality of "wet" steam, preferably having a quality of less than 80%. Such steam is injected into well 16 through well head 38 by steam pipe 36 out of heat exchanger 15. Steam is then injected into a pipe string 18 running down well casing 17. Pipe string 18 may be spaced as by centralizers 20 from casing 17 to prevent loss of heat from the steam to earth formations along the length of casing 17 to the desired injection depth, such as earth formation 24 forming reservoir 22.

The permeability of nearly all sedimentary earth formations which form petroleum reservoirs, such as 22, are inherently inhomogeneous to flow of connate fluids, water, oil and gas. Each of these fluids tends to flow selectively in permeability channels that have the least resistance to such flow. The resistance to flow of each fluid primarily depends upon its viscosity either alone or in mixed phase with the other fluids. Typically, the resulting or relative permeability of the flow paths for each fluid is different within each formation. Since gases are more mobile than either oil or water, or their mixtures, injected steam in general tends to flow through more permeable gas channels and may form "fingers" 26 in formation 22 as indicated by dotted lines. This gas flow by-passes "tighter" or less permeably zones wherein the oil-permeable passages are smaller or the oil is more tightly bound to the surface of the rock. In particular, the oil may also be in contact with clay or shale material with sand or carbonate components that form the permeable channels. Thus, "fingering" develops as indicated by channels 26, or "gas override" occurs as indicated by area 25 at the top of formation 22. Where these develop, energy is lost and large portions of the liquid oil are not heated by the injected steam. With steam flow predominantly through higher permeability gas channels 25 and 26, the injection profile is distorted, as indicated generally by dotted line 28.

As discussed above, distortion of the injection profile may be corrected by addition of a foam-forming component to steam injection line 36. For this purpose, surfactant solution is supplied by tanks 30 and 31 through metering pump 35 and injection line 37. Foam may be created within the formation either by forming it with gas or steam within the steam supply line or upon contact with formation fluids. The foam so injected preferentially flows with the steam to gas-permeable channels 25, 26. It effectively plugs them temporarily so that steam in the formation is then diverted to heat the oil-rich portions of the formation. The desired result is indicated by the relatively piston-like movement of the steam front indicated by dotted lines 24.

In the present illustration, oil is produced from an adjacent producing well, such as 50, by a pump 52. It will also be understood that formation 22 may be cyclically heated by steam, and then periodically oil produced from injection well 16 through pipe 18 by rearranging well head 38 so that is supports a pumping unit similar to pump 52 on well string 53 in well 50.

The surfactant composition prepared in accordance with the present invention, is preferably supplied as a liquid solution and pumped as a foam forming concentrate from tank 30 for mixing with reservoir compatible water from tank 31. The solution is metered by pump 35 through line 37 at a desired rate to contact steam flowing in line 36 or pipe 18. Alternatively, the foam may be formed with gas from a gas source (not shown). Suitable gases may include nitrogen, flue gas, methane, carbon dioxide, carbon monoxide or air. Such gas would be added through well head 38 as by line 36.

In order to further illustrate the present invention and the advantages associated therewith, the following specific examples are given, in being understood that the same are intended only as illustrative and in nowise are limited.

EXAMPLES

Example 1

| Basic Formulation without a viscosity control agent | |
|---|---|
| | Wt % |
| Water | 84.92 |
| 50% NaOH | 2.37 |
| Makon 6 | 0.62 |
| $C_{20}$–$C_{24}$ Alkyl toluene sulfonic acid | 11.29 |
| Sodium bicarbonate | .80 |
| Total | 100.00 |

This is a standard formulation which is subject to the field handling problem. Makon 6 is a trademark of Stepan Chemical Co., for a nonylphenol ethoxylate with an average of 6 ethylene oxylates per molecule.

| Basic Formulations Including a Viscosity Control Agent | |
|---|---|
| | Wt.% |
| Water | 84.12 |
| 50% NaOH | 2.37 |
| Makon 6 | 0.62 |
| $C_{20}$–$C_{24}$ Alkyl toluene sulfonic acid | 11.29 |
| Sodium bicarbonate | .80 |
| AOSD | .80 |
| Total | 100.00 |

| | Wt % |
|---|---|
| Water | 84.12 |
| 50% NaOH | 2.37 |
| Makon 6 | 0.62 |
| $C_{20}$–$C_{24}$ Alkyl toluene sulfonic acid | 11.29 |
| Sodium bicarbonate | .80 |
| $C_{12}$ AOS | .80 |
| Total | 100.00 |

Freeze Thaw Cycle Definition 1 day cycle: 16 hr at about 20° F., eight hours at ambient room temperature, about 70° F.

5 day cycle: 5 days at about 20° F., 1–2 days at ambient room temperature, about 70° F.

25 day or 1 month cycle: time specified at about 20° F., 2–3 days at ambient room temperature, about 70° F.

Viscosity Determination

Viscosity measurements were carried out at 70° F. using a Brookfield viscometer, LV spindle 3, 6 rpm, and are expressed in centipoise (cp). If the sample was off scale, LV spindle 4 was used.

Example 2
Neutralization and Formulation

To a 2 liter flask is added 763.5 g water, 19 g 50% sodium hydroxide, and 6.2 g Makon 6. The mixture is stirred and heated to about 70° C., and 113 g (0.24 m) of the $C_{20}-C_{24}$ alkyl toluene sulfonic acid is added via a dropping funnel over a period of about 30 minutes. If necessary, the pH of the mixture is adjusted to about 9.0-9.5 by adding additional sodium hydroxide. The sulfonate content (equivalent weight 494) was about 11%, as determined by Hyamine titration.

Solutions of sodium bicarbonate in water and additive were added to 90 g of the above sulfonate mixture with stirring. In this example, $C_{12}$ alpha-olefin sulfonate (AOS, 40% solution) was used as the additive.

| Material | Run 1 | Run 2 | Run 3 |
|---|---|---|---|
| Sulfonate, g | 90 | 90 | 90 |
| AOS, g | 2.0 | 1.0 | 0.5 |
| NaHCO₃, g | 0.8 | 0.8 | 0.8 |
| Water, g | 7.2 | 8.2 | 8.7 |

Viscosities of the above mixtures were measured at 70° F. They were then exposed to multiple freeze-thaw cycles for varying lengths of time at about 20° F., and the viscosities were remeasured. Results are summarized in Table I.

TABLE I

Viscosity Control: 1 day cycles at 20° F.
Brookfield Viscosity, Centipoise at 70° F.(1)

| Additive | % | 1 | 2 | 3 | 4 | 5 | 6 | 7 | 8 |
|---|---|---|---|---|---|---|---|---|---|
| $C_{12}$AOS(2) | 0 | >40,000 | | | | | | | |
| | 0.5 | 40,000 | | | | | | | |
| | 1 | 100 (2 D) | 160 | 300 | 200 (3 D) | NM | NM | 460 | 660 (4 D) |
| | 2 | 100 (2 D) | 120 | 120 | 180 (3 D) | NM | NM | 500 | 1000 (4 D) |

(1)(D) = Days at 20° F. other than 1 day NM = Not measured
(2)$C_{12}$ Alpha Olefin Sulfonate, 40% solution

Example 3
Addition of Additive to the Neutralized and Formulated Sulfonate Specified amounts of additives were added to the formulation as specified in Example 1. Viscosity results after multiple freeze-thaw cycles are shown in Table II.

The following materials and conditions are employed within the example.

(1) (D)=Days at 20° F., other than 1 day
(2) $C_{12}$ Alpha olefin sulfonate, 40% solution
(3) Alpha olefin sulfonate dimer, 40% solution
(4) Linear dodecylbenzene sulfonate, 12% slurry
(5) Branched dodecylbenzene sulfonate, 42% slurry
(6) As sold by Dow Chemical Company, 45% solution
(7) Nonyl phenol ethoxylate, average of 15 ethylene oxy units/molecule, 70% solution
(8) Alipal CD128, As sold by GAF Chemical, 58% solution
(9) $C_{14}$ Alpha olefin sulfonate, 40% solution
(10) $C_{15-18}$ Alkyltoluene sulfonate, 15% slurry

TABLE II

VISCOSITY CONTROL
BROOKFIELD VISCOSITY, CENTIPOISE AT 70 F.(1)

| ADDITIVE | % | 0 | 1 | 2 | 3 | 4 | 5 | 6 | 7 | 8 | 9 | 10 | 11 |
|---|---|---|---|---|---|---|---|---|---|---|---|---|---|
| | | | | | 1 DAY CYCLES AT 20 F. | | | | | | | | |
| C12AOS (2) | 0 | 500 | 50,000 | | | | | | | | | | |
| | 1 | 260 | 500 | 560 | 660 (3 D) | 850 | 1200 | 1580 | 3000 (3 D) | 6500 (5 D) | 7920 (5 D) | 7320 (5 D) | 5760 (5 D) |
| | 2 | 140 | 160 | 200 | 200 (3 D) | 300 | 400 | 450 | 540 (3 D) | 1700 (5 D) | 2080 (5 D) | 2560 (5 D) | 1920 (5 D) |
| | | | | | 5 DAY CYCLES AT 20 F. | | | | | | | | |
| C12AOS (2) | 0 | 460 | 40,000 | | | | | | | | | | |
| | 1 | 260 | 7700 | 5360 | 7250 | 5650 | 5180 | 5180 | 6580 | | | | |
| | 2 | 140 | 200 | 440 | 1400 | 1580 | 2150 | 2560 | 2420 | 2440 | | | |
| | 3 | 100 | 3700 | 3100 | 2600 | 3120 | 3600 | 2980 | 3200 | 3220 | | | |
| | | | | | 25 DAY CYCLES AT 20 F. | | | | | | | | |
| C12AOS | 1 | 260 | 15,120 | 4680 | 7750 | | | | | | | | |
| | 2 | 140 | 9150 | 4550 | 4200 | | | | | | | | |
| | 3 | 100 | 3250 | 3080 | 2600 | | | | | | | | |
| | | | | | 1 MONTH CYCLES AT 70 F. | | | | | | | | |
| C12AOS (2) | 0 | 500 | 1250 | 1550 | 1240 | | | | | | | | |
| | 1 | 240 | 440 | 440 | 900 | | | | | | | | |
| | 2 | 100 | 140 | 140 | 100 | | | | | | | | |
| | 3 | 80 | 60 | 20 | 60 | | | | | | | | |
| | | | | | 1 DAY CYCLES AT 20 F. | | | | | | | | |
| AOSD (3) | 2 | — | 340 | 500 | 660 | 1500 | 1720 | 2050 | 2500 | 2900 (5 D) | 3120 (5 D) | | |
| | | | | | 5 DAY CYCLES AT 20 F. | | | | | | | | |
| AOSD (3) | 2 | 400 | 720 | 740 | 750 (7 D) | 1050 | 1050 | 1100 | | | | | |
| | | | | | 1 MONTH CYCLES AT 20 F. | | | | | | | | |

TABLE II-continued

VISCOSITY CONTROL
BROOKFIELD VISCOSITY, CENTIPOISE AT 70 F.(1)

| ADDITIVE | % | CYCLES | | | | | | | | | | |
|---|---|---|---|---|---|---|---|---|---|---|---|---|
| | | 0 | 1 | 2 | 3 | 4 | 5 | 6 | 7 | 8 | 9 | 10 | 11 |
| AOSD (3) | 2 | 360 | 1700 | 1500 | 5850 | | | | | | | | |
| | | | | | | 1 DAY CYCLES AT 20 F. | | | | | | | |
| NONE | | | 4000 | 11,600 | (3 D) 40,000 | | | | | (5 D) | (5 D) | | |
| C12 LABS (4) | 6.9 | | 300 | 440 | 640 | 2140 | 2200 | 2600 | 2900 | 4080 | 4280 | | |
| C12 BABS (5) | 1.9 | | 360 | 660 | 1000 | 3380 | 3450 | 4080 | 4700 | 5760 | 6920 | | |
| DOWFAX3B2 (6) | 1.8 | | 200 | 300 | 360 | 520 | 620 | 700 | 840 | 1120 | 1400 | | |
| DOWFAX2A1 (6) | 1.8 | | 300 | 400 | 500 | 660 | 740 | 860 | 950 | 1300 | 1450 | | |
| NPE (7) | 1.14 | | 460 | 660 | 940 | 1880 | 2500 | 2960 | 3600 | 6550 | 6000 | | |
| ALIPAL (8) | 1.4 | | 240 | 260 | 340 | 400 | 540 | 560 | 700 | 1380 | 1800 | | |
| C14 ADS (9) | 2 | | 340 | 3900 | 2900 | 2660 | 2900 | 3100 | 3300 | 4220 | 4100 | | |
| BATS (10) | 5.3 | | 550 | 1300 | 2300 | 6240 | 6850 | 3840 | 11,000 | 13,300 | 13,400 | | |

As can be seen by the data in Tables I and II, the present invention is effective in preventing the gelling of the mixture which otherwise would occur, as illustrated by the comparative examples.

While the invention has been described in terms of various preferred embodiments, the artisan will appreciate that various modifications, substitutes, ommitants, and changes may be made without departing from the spirit thereof. Accordingly, it is intended that the scope of the present invention be limited solely by the scope of the following claims including equivalents thereof.

I claim:

1. A method for the enhanced recovery of hydrocarbons from a hydrocarbon during gas injection into said reservoir which comprises:

periodically injecting gas comprising steam and a mixture including an alkyl aromatic sulfonate into the reservoir from a known depth interval in a wall to provide a foam in the presence of hydrocarbons in high gas permeable channels of said reservoir, wherein the mixture comprises water, an effective foam-forming amount of an alkyl aromatic sulfonate component having an average molecular weight of about 400 to about 600 and at least one alkyl group comprising 16 to 40 carbon atoms, and a viscosity control agent, wherein the viscosity control agent is present in an amount effective to prevent gelling of the mixture prior to use and further wherein the ratio of the alkyl aromatic sulfonate to the viscosity control agent is 50:50–99:1;

contacting the hydrocarbons in said reservoir with the resulting foam and said gas away from said injection interval to assist movement of the hydrocarbons toward a producing interval in said reservoir; and recovering hydrocarbons from said producing interval.

2. The method of claim 1 wherein the carbon content of the at least one alkyl group comprises 20 to 30 carbon atoms.

3. The method of claim 2 wherein the alkyl aromatic sulfonate comprises about 9 to about 11% by weight of the mixture.

4. The method of claim 1 wherein the carbon content of the at least one alkyl group comprises 20 to 24 carbon atoms.

5. The method of claim 4 wherein the alkyl aromatic sulfonate has an average molecular weight of about 475 to about 525.

6. The method of claim 5 wherein the alkyl aromatic sulfonate comprises about 9 to about 11% by weight of the mixture.

7. The method of claim 5 wherein the at least one alkyl group is a linear alkyl group or a branched alkyl group.

8. The method according to claim 7 wherein the viscosity control agent comprises alpha olefin sulfonates, alpha olefin sulfonate dimers, alkylphenolethoxylates, alkyl diphenylether disulfonates, dialkyl diphenylether disulfonates, alcohol ethoxysulfates, alcohol ethoxy sulfonates, low molecular weight alkyl aromatic sulfonates, or mixtures thereof.

9. The method of claim 8 wherein the alkyl aromatic sulfonate comprises about 9 to about 11% by weight of the mixture.

10. The method of claim 9 wherein the aromatic component of the alkyl aromatic sulfonate comprises benzene, ethyl benzene, toluene, xylene, cumene or naphthalene.

11. The method of claim 9 wherein the sulfonate component of the alkyl aromatic sulfonate is in a water soluble salt form which comprises sodium, potassium, ammonium or an alkyl ammonium.

12. The method of claim 9 wherein the sulfonate component of the alkyl aromatic sulfonate is in an acid form.

13. The method of claim 7 wherein the viscosity control agent comprises about 0.8 to about 1.6% by weight of the mixture.

14. The method according to claim 4 wherein the viscosity control agent comprises alpha olefin sulfonates, alpha olefin sulfonate dimers, alkylphenolethoxylates, alkyl diphenylether disulfonates, dialkyl diphenylether disulfonates, alcohol ethoxysulfates, alcohol ethoxy sulfonates, low molecular weight alkyl aromatic sulfonates, or mixtures thereof.

15. The method of claim 14 wherein the viscosity control agent comprises about 0.8 to about 1.6% by weight of the mixture.

16. The method of claim 4 wherein the alkyl aromatic sulfonate comprises about 9 to about 11% by weight of the mixture.

17. The method according to claim 4 wherein the weight ratio of alkyl aromatic sulfonate to viscosity control agent is about 80:20 about 97:3.

18. The method of claim 9 wherein the weight ratio of alkyl aromatic sulfonate to viscosity control agent is about 92.5:7.5 to about 97:3.

19. The method of claim 1 wherein the alkyl aromatic sulfonate has an average molecular weight of about 450 to about 550.

20. The method of claim 1 wherein the alkyl aromatic sulfonate has an average molecular weight of about 475 to about 525.

21. The method according to claim 1 wherein the viscosity control agent comprises alpha olefin sulfonates, alpha olefin sulfonate dimers, alkylphenolethoxylates, alkyl diphenylether disulfonates, dialkyl diphenylether disulfonates, alcohol ethoxysulfates, alcohol ethoxy sulfonates, low molecular weight alkyl aromatic sulfonates, or mixtures thereof.

22. The method of claim 21 wherein the viscosity control agent comprises about 0.8 to about 1.6% by weight of the mixture.

23. The method according to claim 1 wherein the viscosity control agent comprises an alpha olefin sulfonate (AOS) comprising 10 to 24 carbon atoms and which is present in an amount of about 0.2 to about 5% by weight of the mixture.

24. The method of claim 23 wherein the AOS comprises 12 to 16 carbon atoms.

25. The method of claim 23 wherein the AOS comprises 12 to 14 carbon atoms.

26. The method according to claim 1 wherein the viscosity control agent comprises an alpha olefin sulfonate dimer which is present in an amount of about 0.2 to about 5% by weight of the mixture.

27. The method according to claim 1 wherein the viscosity control agent comprises about 0.2 to about 5% by weight of the mixture.

28. The method of claim 1 wherein the viscosity control agent comprises about 0.4 to about 2% by weight of the mixture.

29. The method of claim 1 wherein the viscosity control agent comprises about 0.8 to about 1.6% by weight of the mixture.

30. The method of claim 1 wherein the aromatic component of the alkyl aromatic sulfonate comprises benzene, ethyl benzene, toluene, xylene, cumene or naphthalene.

31. The method of claim 1 wherein the sulfonate component of the alkyl aromatic sulfonate is in a water soluble salt form which comprises sodium, potassium, ammonium or an alkyl ammonium.

32. The method of claim 1 wherein the sulfonate component of the alkyl aromatic sulfonate is in an acid form.

33. The method of claim 1 wherein the alkyl aromatic sulfonate comprises about 5 to about 20% by weight of the mixture.

34. The method of claim 1 wherein the alkyl aromatic sulfonate comprises about 8 to about 12% by weight of the mixture.

35. The method of claim 1 wherein the alkyl aromatic sulfonate comprises about 9 to about 11% by weight of the mixture.

36. The method of claim 1 wherein gas further includes nitrogen, methane, flue gas, carbon dioxide, carbon monoxide, air, or mixtures thereof.

37. The method of claim 1 wherein the water phase of the steam contains about 0.01 to 5% by weight of an electrolyte.

38. A process for recovering hydrocarbons from a subterranean hydrocarbon bearing formation penetrated by at least one injection well and at least one production well, said process comprising:

periodically injecting gas comprising steam and a mixture including an alkyl aromatic sulfonate into the formation to provide a foam in the presence of hydrocarbons in high gas permeable channels of the formation, wherein the mixture comprises water, an effective foam-forming amount of an alkyl aromatic sulfonate having an average molecular weight of from about 400 to about 600 and an alkyl group comprising from 16 to 40 carbon atoms, and a viscosity control agent which is present in an amount effective to prevent gelling of the mixture prior to use and further wherein the ratio of the alkyl aromatic sulfonate to the viscosity control agent is 50:50–99:1;

passing said steam and foam into said formation and away from said injected well to assist the movement of hydrocarbons toward a production well; and recovering hydrocarbons at said production well.

39. The method of claim 38 wherein the carbon content of the at least one alkyl group is linear or branched and comprises 20 to 24 carbon atoms.

40. The method of claim 39 wherein the alkyl aromatic sulfonate has an average molecular weight of about 475 to about 525.

41. The method according to claim 39 wherein the viscosity control agent comprises alpha olefin sulfonates, alpha olefin sulfonate dimers, alkylphenolethoxylates, alkyl diphenylether disulfonates, dialkyl diphenyl ether disulfonates, alcohol ethoxysulfates, alcohol ethoxy sulfonates, low molecular weight alkyl aromatic sulfonates, or mixtures thereof.

42. The method of claim 41 wherein the viscosity control agent comprises about 0.8 to about 1.6% by weight of the mixture.

43. The method of claim 42 wherein the alkyl aromatic sulfonate comprises about 9 to about 11% by weight of the mixture.

44. The method according to claim 38 wherein the viscosity control agent comprises alpha olefin sulfonates, alpha olefin sulfonate dimers, alkylphenolethoxylates, alkyl diphenylether disulfonates, dialkyl diphenyl ether disulfonates, alcohol ethoxysulfates, alcohol ethoxy sulfonates, low molecular weight alkyl aromatic sulfonates, or mixtures thereof.

45. The method according to claim 38 wherein the viscosity control agent comprises about 0.2 to about 5% by weight of the mixture.

46. The method of claim 38 wherein the aromatic component of the alkyl aromatic sulfonate comprises benzene, ethyl benzene, toluene, xylene, cumene or naphthalene.

47. The method of claim 38 wherein the sulfonate component of the alkyl aromatic sulfonate is in a water soluble salt form which comprises sodium, potassium, ammonium or an alkyl ammonium.

48. The method of claim 38 wherein the sulfonate component of the alkyl aromatic sulfonate is in an acid form.

49. The method of claim 38 wherein the alkyl aromatic sulfonate comprises about 9 to about 11% by weight of the mixture.

50. The method of claim 38 wherein gas further includes nitrogen, methane, flue gas, carbon dioxide, carbon monoxide, air, or mixtures thereof.

51. The method of claim 38 wherein the water phase of the steam contains about 0.01 to 5% by weight of an electrolyte.

52. The method according to claim 38 wherein the weight ratio of alkyl aromatic sulfonate to viscosity control agent is about 80:20 to about 97:3.

53. The method according to claim 38 wherein the weight ratio of alkyl aromatic sulfonate to viscosity control agent is about 92.5:7.5 to about 97:3.

54. The method according to claim 38 wherein the viscosity control agent comprises an alpha olefin sulfonate (AOS) comprising 10 to 24 carbon atoms and which is present in an amount of about 0.2 to about 5% by weight of the mixture.

55. The method of claim 54 wherein the AOS comprises 12 to 16 carbon atoms.

56. The method of claim 54 wherein the AOS comprises 12 to 14 carbon atoms.

57. The method according to claim 38 wherein the viscosity control agent comprises an alpha olefin sulfonate dimer which is present in an amount of about 0.2 to about 5% by weight of the mixture.

* * * * *